(12) United States Patent
Sakashita et al.

(10) Patent No.: US 10,213,090 B2
(45) Date of Patent: Feb. 26, 2019

(54) STICKY CLEANER FOR REMOVING ORGANIC DIRT

(71) Applicants: KABUSHIKI KAISHA NITOMS, Chuo-ku, Tokyo (JP); NITTO DENKO CORPORATION, Ibaraki-shi, Osaka (JP)

(72) Inventors: Teiji Sakashita, Tokyo (JP); Satoshi Taguchi, Tokyo (JP); Yumi Kawai, Tokyo (JP); Aya Nagatomo, Osaka (JP)

(73) Assignees: KABUSHIKI KAISHA NITOMS, Shinagawa-ku, Tokyo (JP); NITTO DENKO CORPORATION, Ibaraki-shi, Osaka (JP)

( * ) Notice: Subject to any disclaimer, the term of this patent is extended or adjusted under 35 U.S.C. 154(b) by 0 days.

(21) Appl. No.: 14/392,272

(22) PCT Filed: Jun. 23, 2014

(86) PCT No.: PCT/JP2014/066561
§ 371 (c)(1),
(2) Date: Dec. 24, 2015

(87) PCT Pub. No.: WO2014/208500
PCT Pub. Date: Dec. 31, 2014

(65) Prior Publication Data
US 2016/0213222 A1    Jul. 28, 2016

(30) Foreign Application Priority Data
Jun. 25, 2013 (JP) .................................. 2013-133202

(51) Int. Cl.
*A47L 25/00* (2006.01)
*C08F 297/02* (2006.01)
(Continued)

(52) U.S. Cl.
CPC .......... *A47L 25/005* (2013.01); *C08F 297/02* (2013.01); *C11D 3/3761* (2013.01); *C11D 17/04* (2013.01)

(58) Field of Classification Search
CPC ........ A47L 25/005; A47L 1/00; C09J 7/0278; C09J 7/0221
See application file for complete search history.

(56) References Cited

U.S. PATENT DOCUMENTS 3,208,093 A      9/1965 Hansen
9,334,423 B2 *   5/2016 Tobing .................. C09J 7/0221
(Continued)

FOREIGN PATENT DOCUMENTS

CA      2 407 047 A1     11/2001
CN      1466602 A        1/2004
(Continued)

OTHER PUBLICATIONS

International Search Report for PCT/JP2014/066561 dated Sep. 16, 2014 [ISA/210].
(Continued)

*Primary Examiner* — Shay Karls
(74) *Attorney, Agent, or Firm* — Sughrue Mion, PLLC

(57) ABSTRACT

A sticky cleaner is provided for use in removing organic dirt stuck on a surface of an article. The sticky cleaner comprises a dirt-collecting member that collects the organic dirt as it makes contact with the surface of the article. The dirt-collecting member comprises a PSA at a part where it makes contact with the surface of the article. The PSA comprises, as its base polymer, an acrylic block copolymer having a hard segment (A) and a soft segment (B) in one molecule.

16 Claims, 4 Drawing Sheets

(51) Int. Cl.
  *C11D 17/04* (2006.01)
  *C11D 3/37* (2006.01)

(56) References Cited

U.S. PATENT DOCUMENTS

| | | |
|---|---|---|
| 2004/0034183 A1 | 2/2004 | Kato et al. |
| 2004/0058116 A1 | 3/2004 | Sano et al. |
| 2006/0016037 A1 | 1/2006 | Flora et al. |
| 2006/0173124 A1 | 8/2006 | Paul et al. |
| 2009/0263153 A1 | 10/2009 | Uenda et al. |
| 2012/0042902 A1 | 2/2012 | Uenda |
| 2012/0110760 A1 | 5/2012 | Huang |
| 2013/0125322 A1 | 5/2013 | Sakashita et al. |

FOREIGN PATENT DOCUMENTS

| | | |
|---|---|---|
| CN | 1814686 A | 8/2006 |
| CN | 101297395 A | 10/2008 |
| CN | 1926273 B | 12/2010 |
| CN | 201768726 U | 3/2011 |
| CN | 202135878 U | 2/2012 |
| CN | 103108581 A | 5/2013 |
| EP | 1 340 450 A1 | 9/2003 |
| EP | 1 649 099 A1 | 4/2006 |
| EP | 1 686 163 A2 | 8/2006 |
| EP | 1 857 517 A2 | 11/2007 |
| EP | 1 94 2519 A1 | 7/2008 |
| EP | 2 113 186 A1 | 11/2009 |
| EP | 2 457 936 A1 | 5/2012 |
| EP | 2 719 736 A1 | 4/2014 |
| EP | 2 737 840 A1 | 6/2014 |
| JP | 7-116623 A | 5/1995 |
| JP | 11-323072 A | 11/1999 |
| JP | 2001-234146 A | 8/2001 |
| JP | 2004-113362 A | 4/2004 |
| JP | 2004-237023 A | 8/2004 |
| JP | 2005-27945 A | 2/2005 |
| JP | 2008-106176 A | 5/2008 |
| JP | 2009-503161 A | 1/2009 |
| JP | 3160823 U | 7/2010 |
| WO | 2005/010264 A1 | 2/2005 |
| WO | 2007/017098 A1 | 2/2007 |
| WO | 2012/129366 A2 | 9/2012 |
| WO | 2012/169501 A1 | 12/2012 |
| WO | 2013/015075 A1 | 1/2013 |

OTHER PUBLICATIONS

Examiner's Decision of Refusal dated Aug. 31, 2017, from the Japanese Patent Office in counterpart application No. 2015-524038.
Communication dated Jan. 22, 2018 issued by the European Patent Office in counterpart application No. 14818809.7.
First Notice of the Opinion on Examination dated Mar. 21, 2017 issued by the State Intellectual Property Office of People's Republic of China in counterpart application No. 201480035881.9.
European Search Report dated Feb. 10, 2017 issued by the European Patent Office in counterpart application No. 14818809.7.
Notification of Reason for Refusal dated Apr. 5, 2018 from the Japanese Patent Office in counterpart Japanese application No. 2015-524038.
Notification of Second Office Action dated Mar. 13, 2018 from the State Intellectual Property Office of the P.R.C., in counterpart Chinese application No. 201480035881.9.
Decision of Rejection dated Sep. 27, 2018, from the Japanese Patent Office in counterpart application No. 2015-524038.
Summons to attend oral proceedings dated Oct. 8, 2018, from the European Patent Office in counterpart European Application No. 14818809.7.
Third Office Action dated Oct. 29, 2018, from the State Intellectual Property Office of People's Republic of China in counterpart Application No. 201480035881.9.

\* cited by examiner

[Fig. 1]
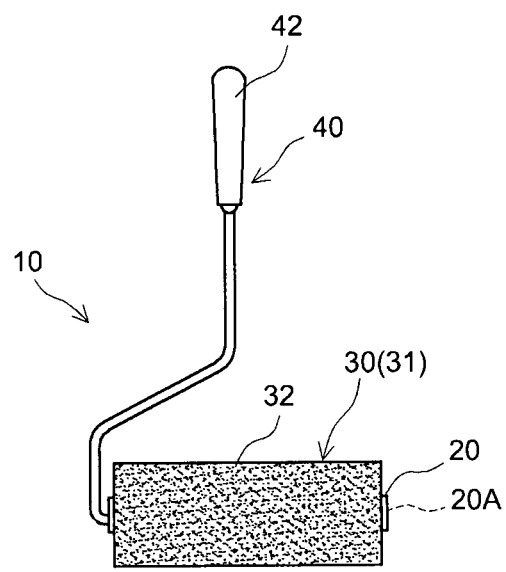
[Fig. 2]
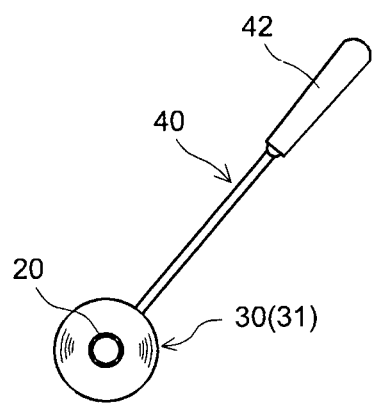

[Fig. 3]
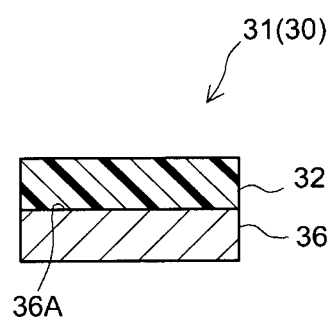

[Fig. 4]
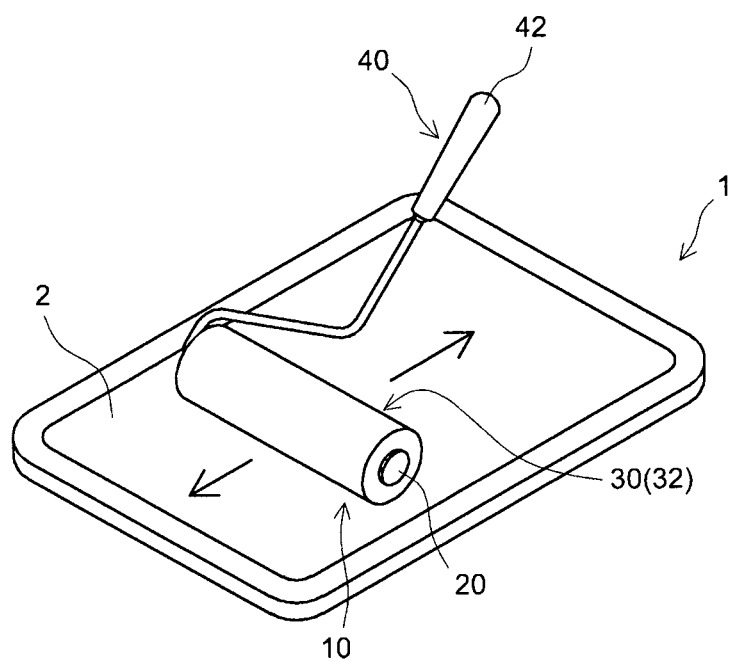

[Fig. 5]
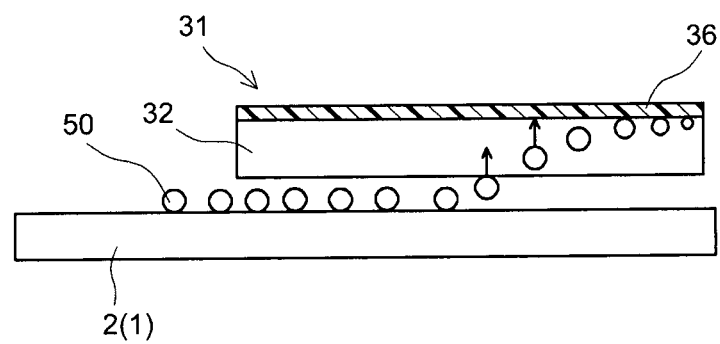

STICKY CLEANER FOR REMOVING ORGANIC DIRT

CROSS REFERENCE TO RELATED APPLICATIONS

This application is a National Stage of International Application No. PCT/JP2014/066561 filed Jun. 23, 2014, claiming priority based on Japanese Patent Application No. 2013-133202, filed Jun. 25, 2013, the contents of all of which are incorporated herein by reference in their entirety.

TECHNICAL FIELD

The present invention relates to a sticky cleaner used for removing organic dirt. In particular, it relates to a sticky cleaner used for removing sebum and other organic dirt from a surface (e.g. a surface of a touch panel display/input screen) in a portable device such as a tablet terminal, smartphone and the like.

The present application claims priority based on Japanese Patent Application No. 2013-133202 filed on Jun. 25, 2013 and the entire contents thereof are incorporated herein by reference.

BACKGROUND ART

Displays typically formed of liquid crystal panels or an organic EL panels are placed on surfaces of portable devices, for instance, portable PCs such as notebook PCs; tablet terminal such as electronic books; mobile phones such as smartphones; mobile gaming devices; various types of PDA (personal digital assistant); and the like. These portable devices are carried and used on a daily basis, and thus easily attract dust and organic dirt such as finger marks, cosmetics and sebum. In particular, recently wide-spread touch-screen portable devices comprise display/input members and are operated with a direct finger touch by a user to the display/input members with the displays functioning also as input devices, and thus are more likely to attract organic dirt such as finger marks, sebum, etc. Not just these portable devices, but also show window glass, glass tables, showcases and the like accumulate organic dirt, leading to degradation of their exterior to make them unsightly.

As means to remove organic dirt stuck on the surface (screen) of the display member, a wipe (waste cloth) made of paper, woven fabric or non-woven fabric is used. For instance, when the dirt includes an oily component such as sebum and the like, wiping off dirt with a wipe is not necessarily convenient to use, possibly spreading the dirt depending on how it is done, etc. The wipe gradually accumulates dirt with continuous use, requiring regular cleaning or replacement of wipes, which can be troublesome. There is also a means where organic dirt is removed by wiping the surface with a suitable material (e.g. sponge or gauze) containing a suitable detergent (e.g. see Patent Document 2). However, not only is careful handling of the detergent necessary, but some remaining detergent could also alter the surface. This method thus requires elimination of the detergent and thus is not advantageous in terms of workability. Patent Document 1 discloses a sticky cleaner for a plate surface. However, there has been some room for further improvement in terms of the convenience of use, etc.

CITATION LIST

Patent Literature

[Patent Document 1] WO 2013/015075
[Patent Document 2] Japanese Patent Application Publication No. 2009-503161
[Patent Document 3] Japanese Patent Application Publication No. 2004-237023

SUMMARY OF INVENTION

Technical Problem

The present invention has been made to solve the conventional problem. An objective thereof is to provide a sticky cleaner that can conveniently remove sebum and other organic dirt stuck on a surface of an article.

Solution to Problem

To achieve the objective, the present invention provides a sticky cleaner used for removing sebum and organic dirt stuck on a surface of an article. The sticky cleaner comprises a dirt-collecting member that collects the organic dirt as it makes contact with the surface of the article. The dirt-collecting member comprises a pressure-sensitive adhesive (PSA) at a part where it makes contact with the surface of the article. The PSA comprises, as its base polymer, an acrylic block copolymer having a hard segment (A) and a soft segment (B) in one molecule.

When the PSA constituting the dirt-collecting member is allowed to make contact with the surface (surface to be cleaned) of the article, the sticky cleaner (dirt-collecting device) thus constructed can catch organic dirt stuck on the surface and easily remove it from the surface.

The monomer units that constitute the soft segment (B) preferably comprise an alkyl acrylate having 6 or more carbon atoms in its alkyl group, and preferably comprise, for instance, the alkyl acrylate having 6 or more carbon atoms in its alkyl group as its primary component. The PSA comprising an acrylic block copolymer having such a soft segment (B) as its base polymer can make a sticky cleaner of higher performance. A preferable example of the alkyl acrylate having 6 or more carbon atoms in its alkyl group is 2-ethylhexyl acrylate (2EHA).

The PSA preferably further comprises a plasticizer. The plasticizer added to the acrylic block copolymer can increase the dirt-collecting ability. The inclusion of the plasticizer may facilitate the release from the surface to be cleaned to increase the dirt-collecting workability. In addition, even when the dirt-collecting capability degrades as a result of its use, the effect (dirt-removing ability recovery effect) to regain its dirt-collecting capability in relatively short time (e.g. in several minutes or several hours) can be preferably produced. The inclusion of the plasticizer in the PSA is preferable also from the standpoint of lowering the viscosity of the PSA.

The PSA can further comprise a tackifier resin. The tackifier resin content may reduce the viscosity (typically the melt viscosity) of the PSA, thereby facilitating the application of the PSA. Especially, it can facilitate the hot melt application. This is advantageous from the standpoint of increasing the productivity of the sticky cleaner and reducing environmental stress. The inclusion of the tackifier resin in the PSA may be useful in increasing the dirt-collecting capability as well.

The surface-contacting part of the dirt-collecting member preferably exhibits an adhesive strength of 1 N/25 mm or less. This means that the dirt-collecting member is easy-release. A cleaner having such an easy-release dirt-collecting member provides excellent dirt-removing workability since it requires little force to do the dirt-removing work on the surface. Furthermore, because of the easy-release nature, even when the article's surface (e.g. tablet terminal's display) is covered with removable protection film, the protection film is less likely to get peeled off while cleaning the article's surface covered with the protection film (i.e. the surface of the protection film). In addition, despite such easy-release nature, it can sufficiently remove organic dirt. As described above, the examples of organic dirt include sebum from the skin, and as evident from this, it may include inorganic substances such as sodium and potassium as well as their salts, etc. The adhesive strength refers to the 180° peel strength to SUS measured based on the 180° peel test described later.

In a preferable embodiment, the sticky cleaner disclosed herein comprises a cylindrical rolling member and the dirt-collecting member is arranged along the lateral surface of the rolling member. According to a cleaner thus constructed, when the rolling member is allowed to rotate in the circumferential direction of the cylinder, the dirt-collecting member on the lateral surface can efficiently collect and remove organic dirt from the article's surface.

The sticky cleaner disclosed herein may further comprise a grip member that supports the rolling member in a freely rotatable manner. With this configuration, a user can hold the grip member and rotate the rolling member to efficiently remove organic dirt from the article's surface.

In a preferable embodiment of the sticky cleaner disclosed herein, the dirt-collecting member is constituted as an adhesively single-faced PSA sheet comprising a sheet of support substrate and a PSA layer placed on or above the support substrate. The single-faced PSA sheet can be wound with the PSA layer on the outside to form a PSA sheet roll. With a sticky cleaner having such a constitution, the lateral surface of the PSA sheet roll can be used to remove dirt from the article's surface. In accordance with the usage and the amount of dirt caught on the PSA layer, the lateral surface used for dirt removal can be eliminated from (typically peeled off) the roll to expose an unused section of the PSA layer on the lateral surface. In other words, the PSA layer can be easily refreshed to expose an unused section to the outer surface. Accordingly, a desirable level of dirt-removing ability can be consistently maintained.

A sticky cleaner having the prescribed configuration disclosed herein can effectively remove organic dirt (typically sebum dirt of animal origin, e.g. human sebum dirt). Accordingly, a preferable embodiment of the sticky cleaner disclosed herein is a sticky cleaner used for removing sebum dirt as the organic dirt. The sebum dirt in this description refers to dirt comprising sebum and means to encompass dirt being a mixture of sebum and other organic components as well as inorganic components. Thus, the concept of sebum dirt may include dirt from hands and fingerprints as well as, for instance, a mixture of sebum and inorganic components such as pigment in foundation cream, a mixture of sebum and inorganic components in perspiration such as sodium chloride, a mixture of sebum and organic components such as of moisturizing cream and sunscreen, etc.

In a preferable embodiment of the sticky cleaner disclosed herein, the article is a portable device having a display with a surface (typically a smooth, flat surface) formed of glass or synthetic resin. The portable device is carried and used on a daily basis and is likely to attract organic dirt such as finger marks, cosmetics and sebum. In particular, a portable device having a touch panel display (display/input member) is operated with a direct finger touch to the display/input portion, and thus is more likely to attract organic dirt such as finger marks, cosmetics, sebum, etc. The sticky cleaner disclosed herein can easily remove such organic dirt; and therefore, it is particularly preferably used for removing dirt from a portable device having a display as described above (e.g. a touch panel display). Sticky cleaners have been conventionally used (e.g. see Patent Document 3). However, conventional roller cleaners are used for cleaning floors and carpets, but not intended for cleaning surfaces (e.g. touch panel display/input portions) of portable devices (e.g. tablet terminals and smartphones) as described above.

BRIEF DESCRIPTION OF DRAWINGS

FIG. 1 shows a front view schematically illustrating the sticky cleaner according to an embodiment.

FIG. 2 shows a side view schematically illustrating the sticky cleaner according to an embodiment.

FIG. 3 shows a cross-sectional view schematically illustrating the dirt-collecting member constituting the sticky cleaner according to an embodiment.

FIG. 4 shows a perspective view schematically illustrating an example of usage of the sticky cleaner according to an embodiment.

FIG. 5 shows a diagram schematically illustrating the mechanism of dirt-removing ability recovery effect of the sticky cleaner according to an embodiment.

DESCRIPTION OF EMBODIMENTS

Preferred embodiments of the present invention are described below. Matters necessary to practice this invention other than those specifically referred to in this description may be understood as design matters to a person of ordinary skill in the art based on the conventional art in the pertinent field. The present invention can be practiced based on the contents disclosed in this description and technical common knowledge in the subject field. In this description, the terms "weight," "% by weight" and "parts by weight" are treated synonymously to "mass," "% by mass" and "parts by mass," respectively. In the drawings referenced below, a common reference numeral may be assigned to members or sites producing the same effects, and duplicated descriptions may be omitted or simplified.

The sticky cleaner disclosed herein is different from conventional sticky cleaners used for cleaning floors and carpets. For instance, it is used to remove organic dirt stuck on the surface of an article such as a portable device. In particular, it is preferable for removing organic dirt stuck on a smooth surface of an article. The article on which the sticky cleaner disclosed herein is used is not particularly limited. An article having a smooth surface (typically a smooth, flat surface) is preferable. Examples of such an article include show window glass, glass tables, showcases, mirrors, tanks (aquariums), various types of display (displays of mounted, free-standing or portable TVs and PCs, etc.), and various types of devices having touch panel display/input members (e.g. free-standing or portable devices such as automated teller machines (ATM), operation terminals of vehicle navigation systems, guide boards, etc.). As organic dirt stuck on their smooth surfaces (typically transparent glass surfaces) is unsightly, if found any, its quick removal is desirable. Thus, on their surface, the sticky cleaner disclosed herein can be preferably used.

Preferable examples of the article on which the sticky cleaner disclosed herein is used include various portable devices. The term portable device herein refers to a mobile device and is not limited to a particular device. A preferable portable device has a smooth surface (typically a smooth, flat surface) at least partially on the outside. Examples of such a portable device include portable devices such as portable PCs such as notebook PCs; tablet terminals such as electronic books, etc.; smartphones and other mobile phones; mobile gaming devices; PDAs (personal digital assistants) such as electronic organizers; digital cameras, digital photo frames, hand-held mirrors and the like. Since these are carried and used on a daily basis, they are likely to attract dust and especially organic dirt such as finger marks, cosmetics and sebum. Some of these portable devices have smooth surfaces (typically glass or synthetic resin surfaces) serving as displays such as liquid crystal displays and organic EL displays. Organic dirt on the displays makes information displayed thereon hard to see, thereby hindering the use. Moreover, depending on the amount of organic dirt stuck thereon, it might give a filthy impression. On portable devices having such displays, the sticky cleaner disclosed herein can be preferably used.

Devices having touch panel display/input portions are likely to attract the organic dirt since users directly touch the displays with fingers. Thus, the sticky cleaner disclosed herein can be preferably used on them. Among them, tablet terminals such as electronic books and the like have relatively large displays; and therefore, they are considered as particularly preferable articles on which the sticky cleaner is used.

The sticky cleaner disclosed herein can be preferably used on a smartphone and other mobile phone. When a mobile phone is brought close to one's ear and mouth for a telephone call, etc., it tends to accumulate organic dirt such as facial sebum and cosmetics on contact with the face. Since the device is used in contact with or in the vicinity of a face, it is greatly significant to remove organic dirt from the surface and keep it looking clean. Thus, these devices are thought as particularly preferable objects on which the sticky cleaner is used.

The sticky cleaner according to an embodiment is described below with reference to drawings. As shown in FIGS. 1 and 2, a sticky cleaner (or simply cleaner, hereinafter) 10 comprises a cylindrical holding member (core) 20 and a PSA sheet roll 30 held on the outer periphery of holding member 20. These holding member 20 and PSA sheet roll 30 are assembled to form a cylindrical rolling member. The holding member material is not particularly limited. A holding member made of a polyolefin or other synthetic resin as well as paper can be preferably used.

Cleaner 10 further comprises a grip member 40 in a form of a pole that supports holding member 20 in a freely rotatable manner. In particular, holding member 20 has a center hole (not shown in the drawings) formed where the central axis of the cylinder is located. A terminal section (one end) of grip member 40 is inserted through the center hole, whereby holding member 20 is installed on grip member 40 in a freely rotatable manner. To the other end of grip member 40, a handle 42 is attached. The materials of grip member and handle are not particularly limited. For instance, metal or synthetic resin pieces can be used.

PSA sheet roll 30 in cleaner 10 is formed by winding a PSA sheet 31 that serves as the dirt-collecting member. In particular, PSA sheet (dirt-collecting member) 31 is constituted as a single-faced PSA sheet 31 comprising, as shown in FIG. 3, a support substrate 36 in a form of a long sheet (band) and a PSA layer 32 placed on one face 36A of the support substrate 36. Single-faced PSA sheet 31 is wound with the PSA layer 32 on the outside and formed as a PSA sheet roll 30.

With respect to cleaner 10 having a constitution as described above, some applications are now described. As shown in FIG. 4, cleaner 10 is used for removing organic dirt stuck on a display 2 of a portable device 1. Display 2 in portable device 1 has a smooth, flat surface. An operator places cleaner 10 on the display 2 of portable device 1, grip a handle 42, and applies a prescribed amount of external force to cleaner 10. The force is then transmitted from grip member 40 to holding member 20, and the PSA layer 32 (a section of the dirt-collecting member that makes contact with the smooth, flat surface) placed on the outer periphery of holding member 20 rotationally moves on display 2. In FIG. 4, PSA sheet roll 30 moves on display 2 in the direction shown by the arrow. During this, the PSA layer 32 collects dust, fine particles, and especially organic dirt (e.g. sebum dirt such as sebum-containing dirt from hands, fingerprints, etc.) present on the display 2. By this means, cleaning (dirt removal) of display 2 is easily and certainly accomplished in the rotation direction of PSA sheet roll 30 (more specifically, the PSA sheet (dirt-collecting member) 31). The portable device in this embodiment is a tablet terminal whose display is entirely formed with tempered glass such as aluminosilicate glass and the like although it is not limited to this as indicated earlier.

The size of the cylindrical PSA sheet roll is not particularly limited. When it is used on portable devices such as tablet terminals, etc., its diameter (which refers to the diameter (outer diameter) before used; the same applies hereinafter) is preferably 4 mm or larger (more preferably 10 mm or larger, e.g. 15 mm or larger, typically 20 mm or larger). From the standpoint of the maneuverability and portability, the diameter is preferably 50 mm or smaller (e.g. 35 mm or smaller, typically 30 mm or smaller).

The PSA sheet constituting the PSA sheet roll preferably has cut lines (not shown in the drawings) at an interval of a length approximately equal to the circumference of the roll. The cut lines provide cutting means for efficiently refresh the PSA layer surface (outer surface of the dirt-collecting member) with a reduced cleaning (dirt-removing) ability after the cleaner is used several times. The cut lines can be, for instance, lines of long holes or wavy slits; intermittent slits such as perforation; and the like. The cut lines are preferably arranged to run across the PSA sheet in the width direction (direction perpendicular to the length direction). Refreshing the outer surface (lateral surface) of the dirt-collecting member is not limited to the cutting means. For instance, intermittent slits such as perforation can be spirally formed in a direction intersecting the winding direction of the PSA sheet roll (typically, in a direction intersecting the width direction at an angle between 30° and 60°). Alternatively, instead of intermittent slits such as perforation, the PSA sheet constituting the PSA sheet roll may comprise slits (continuous cut lines) at a prescribed interval. In this embodiment, the PSA sheet constituting the PSA sheet roll is fully cut in advance at the prescribed intervals in the winding direction of the roll. Thus, the outer surface of the PSA sheet roll can be peeled over the length of the prescribed interval to easily refresh the outer surface.

The cleaner 10 can be produced by suitably employing heretofore known techniques. For instance, PSA sheet roll 30 of cleaner 10 can be fabricated in the same manner as conventional roller cleaners. In other words, a PSA composition is applied to the surface 36A of a long sheet of support substrate 36 by various heretofore known coating means and allowed to dry as necessary to form a PSA layer 32. As for a hot melt PSA (thermoplastic PSA), the PSA heated into a molten state can be applied as the PSA composition and the PSA is allowed to cool to near room temperature to form a PSA layer. Thus, the drying can be omitted. The PSA sheet 31 is wound around holding member 20 with the PSA layer 32 on the outside to form PSA sheet roll 30 in a form of a roll. A terminal section of grip member 40 is further attached to holding member 20 in a freely rotatable manner to construct cleaner 10. The structure of attachment of grip member 40 to holding member 20 can be similar to those in conventional roller cleaners and does not characterize the present invention. Accordingly, detailed description is omitted.

The sticky cleaner is not limited to the embodiment above. The sticky cleaner may be formed, for instance, solely with a dirt-collecting member. Examples of such a sticky cleaner include a cleaner formed solely with a dirt-collecting member in a form of a sphere, column, cylinder, hexahedron (e.g. cuboid), sheet, etc.

In the above embodiment, the dirt-collecting member is formed with the support substrate and PSA layer, but the sticky cleaner is not limited to this embodiment. For instance, the dirt-collecting member may be formed solely with a PSA (substrate-free PSA). When the dirt-collecting member has a support substrate, the shape of the support substrate is not particularly limited. For instance, the dirt-collecting member may have a PSA layer on the outer surface of a spherical support substrate.

In the above embodiment, the grip member supports the holding member in a freely rotatable manner, but the sticky cleaner is not limited to this embodiment. For instance, the grip member may be directly or indirectly joined (connected or detachably joined) to the dirt-collecting member. In an example of such a sticky cleaner, a columnar or cuboid PSA body is fastened to one end of a pole-shaped grip member. Alternatively, the grip member may have a flat portion and the dirt-collecting member may be fastened to one face of the flat portion.

The PSA in the art disclosed herein comprises, as its base polymer, an acrylic block copolymer having a hard segment (A) (or a "A-block" hereinafter) and a soft segment (B) (or a "B-block" hereinafter) in one molecule. In the structure of the acrylic block copolymer, the hard segment (A) refers to the relatively hard block in relation to the soft segment (B) in the acrylic copolymer. The soft segment (B) refers to the relatively soft block in relation to the hard segment (A) in the structure of the acrylic block copolymer.

The acrylic block copolymer may show characteristics of thermoplastic polymers (typically thermoplastic elastomers). The PSA disclosed herein comprises the acrylic block copolymer as the base polymer and thus may be a PSA suited for hot melt application (i.e. a hot melt PSA). The hot melt PSA is preferable from the standpoint of reducing environmental stress, etc., because the amount of organic solvents used can be reduced as compared with a general organic solvent-based acrylic PSA (typically a PSA comprising, as the base polymer, a random copolymer synthesized from starting monomers including an acrylic monomer as the primary monomer by solution polymerization).

Herein, the acrylic block copolymer refers to a polymer having a block structure that comprises, as a monomer unit (monomeric component) constituting the copolymer, a monomer unit derived from a monomer having at least one (meth)acryloyl group per molecule (or an "acrylic monomer" hereinafter). In other words, it refers to a block copolymer comprising a monomer unit derived from an acrylic monomer. For instance, in a preferable acrylic block copolymer, 50% or more of all monomer units are derived from an acrylic monomer. Such an acrylic block copolymer can be preferably synthesized from starting monomer(s) comprising, as the primary monomer, an alkyl(meth)acrylate having an alkyl group. The primary monomer herein refers to a monomer that accounts for 50% by mass or more of all the monomers.

As used herein, the term "(meth)acryloyl" comprehensively refers to acryloyl and methacryloyl. Similarly, the terms "(meth)acrylate" comprehensively refer to acrylate and methacrylate.

A preferable acrylic block copolymer comprises at least one acrylate block (which hereinafter may be referred to as an Ac block) and at least one methacrylate block (which hereinafter may be referred to as an MAc block). For instance, a preferable block copolymer has a structure in which Ac blocks and MAc blocks are positioned alternately. The total block number of Ac blocks and MAc blocks comprised in one polymer molecule can be about 2.5 to 5 in average (e.g. about 2.7 to 3.3, typically about 3).

In typical, the Ac block preferably comprises an alkyl acrylate as the primary monomer. In other words, 50% by mass or more of all monomeric units constituting the Ac block are preferably monomer units derived from an alkyl acrylate. 75% by mass or more (e.g. 90% by mass or more) of the monomer units can be derived from an alkyl acrylate as well. In a preferable embodiment, the Ac block in the acrylic block copolymer is a polymer essentially formed of one, two or more species (typically one species) of alkyl acrylate. Alternatively, the Ac block may be a copolymer of an alkyl acrylate and other monomer (e.g. an alkyl methacrylate, etc.).

An example of the Ac block-constituting alkyl acrylate is an alkyl acrylate having 1 to 20 (preferably 4 to 14, e.g. 6 to 12) carbon atoms in its alkyl group. Examples include methyl acrylate, ethyl acrylate, n-propyl acrylate, isopropyl acrylate, n-butyl acrylate (BA), isobutyl acrylate, tert-butyl acrylate, n-pentyl acrylate, n-hexyl acrylate, n-heptyl acrylate, n-octyl acrylate, 2-ethylhexyl acrylate (2EHA), nonyl acrylate, isononyl acrylate, decyl acrylate, dodecyl acrylate, stearyl acrylate, etc. These can be used singly as one species or in a combination of two or more species.

In a preferable embodiment, 50% by mass or more of monomers constituting the Ac block is an alkyl acrylate having 4 to 14 carbon atoms in its alkyl group. The ratio of alkyl acrylate having 4 to 14 carbon atoms in alkyl group can be 75% by mass or greater or can be essentially 100% by mass (e.g. greater than 99% by mass, but 100% by mass or less). For instance, it is preferable to use a structure in which the monomer unit(s) constituting the Ac block essentially consist of BA or 2EHA, or comprise the two species, BA and 2EHA, and so on. The weight ratio of BA to 2EHA is not particularly limited. For instance, it can be 10/90 to 90/10, preferably 80/20 to 20/80, or more preferably 30/70 to 70/30, for example, 60/40 to 40/60.

It is typically preferable that the MAc block comprises an alkyl methacrylate as the primary monomer. Of all the monomer units constituting the MAc, 75% by mass or more (e.g. 90% by mass or more) can be derived from an alkyl methacrylate. In a preferable embodiment, the MAc block in the acrylic block copolymer is essentially formed of one, two or more species (typically one species) of alkyl methacrylate. Alternatively, the MAc block may be a copolymer of an alkyl methacrylate and other monomer (e.g., an alkyl acrylate).

The alkyl methacrylate constituting the MAc block may be an alkyl methacrylate whose alkyl group has 1 to 20 (preferably 1 to 14) carbon atoms. Specific examples thereof include methyl methacrylate, ethyl methacrylate, n-propyl methacrylate, isopropyl methacrylate, n-butyl methacrylate, isobutyl methacrylate, tert-butyl methacrylate, n-pentyl methacrylate, n-hexyl methacrylate, n-heptyl methacrylate, n-octyl methacrylate, 2-ethylhexyl methacrylate, nonyl methacrylate, isononyl methacrylate, decyl methacrylate, dodecyl methacrylate, stearyl methacrylate, etc. These can be used singly as one species or in a combination of two or more species.

In a preferable embodiment, 50% by mass or more of the monomers constituting the MAc block is an alkyl methacrylate having an alkyl group with 1 to 4 (preferably 1 to 3) carbon atoms. The ratio of the alkyl methacrylate having 1 to 4 carbon atoms in its alkyl group can be 75% by mass or greater, or essentially 100% by mass (e.g. greater than 99% by mass, but 100% by mass or less). Especially preferable alkyl methacrylates include methyl methacrylate (MMA) and ethyl methacrylate (EMA). For example, the monomers preferably employed may consist essentially of MMA alone, EMA alone, both MMA and EMA, or the like.

The acrylic block copolymer may be a copolymer comprising A blocks (hard segments (A)) and B blocks (soft segments (B)) positioned alternately such as AB structure, ABA structure, ABAB structure, ABABA structure, etc., with the A block having been formed of a polymer having a rigid structure with excellent cohesive strength and elasticity, and the B block having been formed of a polymer having a flexible structure with excellent viscosity. A PSA comprising as its base polymer an acrylic block copolymer having such a structure may form a PSA layer combining cohesive strength and elasticity as well as viscosity at high levels. A PSA having such a composition can be preferably used as a hot melt PSA. An acrylic block copolymer having a structure (such as ABA structure, ABABA structure, etc.) with A blocks at both termini of the molecule can be preferably used. An acrylic block copolymer having such a structure is preferable because it is likely to have a good balance of cohesion and thermoplasticity.

When the acrylic block copolymer comprises two or more A blocks, the compositions, molecular weights (polymerization degrees), structures, etc., of these A blocks can be the same with or different from each other. When the acrylic block copolymer comprises two or more B blocks, the same applies to the B blocks.

As the A block, an MAc block as those described above can be preferably used. As the B block, an Ac block as those described above can be preferably used. In a preferable embodiment, the acrylic block copolymer is a triblock copolymer having a structure of MAc-Ac-MAc (ABA structure). For instance, can be preferably used a triblock copolymer with two MAc blocks having essentially identical monomer compositions.

A preferable acrylic block copolymer in the art disclosed herein has, as the soft segment (B), an Ac block comprising an alkyl acrylate having 6 or more (e.g. 6 to 12) carbon atoms in its alkyl group. In the monomer units constituting the Ac block, the ratio of the alkyl acrylate having 6 or more carbon atoms in its alkyl group can be, for instance, 10% by mass or higher, or it is preferably 20% by mass or higher, more preferably 30% by mass or higher, or yet more preferably 40% by mass or higher.

In a preferable embodiment, as the soft segment (B), an acrylic block copolymer that has an Ac block comprising as its primary monomer the alkyl acrylate having 6 or more (e.g. 6 to 12) carbon atoms in its alkyl group can be used. In other words, it is preferable that one, two or more species of alkyl acrylate having 6 or more carbon atoms in its alkyl group account for 50% by mass or more of the monomer units constituting the Ac block. Of the monomer units that constitute the Ac block, the ratio of alkyl acrylate having 6 or more carbon atoms in its alkyl group can be, for instance, 55% by mass or higher, or 60% by mass or higher. It is preferably 70% by mass or higher, more preferably 85% by mass or higher, yet more preferably 95% by mass or higher, or it can be essentially 100% by mass as well. For instance, a preferable acrylic block copolymer has, as the soft segment (B), an Ac block constituted solely with 2EHA as the monomer unit.

Preferable examples of the alkyl acrylate having 6 or more carbon atoms in its alkyl group include 2-ethylhexyl acrylate (2EHA), n-octyl acrylate, isononyl acrylate and n-hexyl acrylate.

An acrylic block copolymer that has as the soft segment (B) an Ac block comprising an alkyl acrylate having 6 or more carbon atoms in its alkyl group may have an excellent organic dirt-collecting ability. Thus, for instance, it may bring about a higher sebum dirt removal rate in the sebum dirt removability test described later.

The acrylic block copolymer that has as the soft segment (B) an Ac block comprising an alkyl acrylate having 6 or more carbon atoms in its alkyl group may have excellent compatibility with plasticizer. In a PSA having a composition that includes the copolymer and a plasticizer, this is preferable from the standpoint of reducing the bleeding (bleed-out) of the plasticizer. Because it allows suitable inclusion of a greater amount of plasticizer, it leads to advantages such as permitting great latitude in selecting the amount of plasticizer added and easy adjustment of the adhesive strength.

The mass ratio of hard segment (A) to soft segment (B) is not particularly limited in the acrylic block copolymer. For instance, the mass ratio (A/B) of hard segment (A) to soft segment (B) can be in a range of 4/96 to 90/10, or it is usually suitably in a range of 7/93 to 70/30 or preferably in a range of 10/90 to 50/50 (e.g. 15/85 to 40/60). In the acrylic block copolymer comprising two or more hard segments (A), the ratio of total mass of these hard segments (A) to mass of soft segment (B) is preferably in these ranges. The same applies to the acrylic block copolymer comprising two or more soft segments (B). When the ratio of hard segment (A) (e.g. MAc block) is high, the adhesive strength tends to decrease, likely providing easy-release properties. When the ratio of soft segment (B) (e.g. Ac block) is high, the organic dirt-collecting ability tends to increase.

In a preferable example of the acrylic block copolymer disclosed herein, the starting monomers corresponding to all the monomer units constituting the acrylic block copolymer comprise an alkyl (meth)acrylate (X) having 1 to 3 carbon atoms in its alkyl group and an alkyl(meth)acrylate (Y) having 6 or more (e.g. 6 to 12) carbon atoms in its alkyl group. The mass ratio (X/Y) of alkyl(meth)acrylate (X) to alkyl(meth)acrylate (Y) can be, for instance, 4/96 to 90/10. An acrylic block copolymer with the mass ratio being 7/93 to 70/30 is preferable, a species with 10/90 to 50/50 is more preferable, a species with 15/85 to 40/60 is yet more preferable, and a species with 15/85 to 30/70 (e.g. 15/85 to 25/75) is particularly preferable. When the ratio of alkyl (meth)acrylate (X) is high, the adhesive strength tends to decrease, likely providing easy-release properties. When the ratio of alkyl(meth)acrylate (Y) is high, the organic dirt-collecting ability tends to increase. As the alkyl(meth)acrylate (X), an alkyl methacrylate having 1 to 3 carbon atoms in its alkyl group is preferable. As the alkyl(meth)acrylate (Y), an alkyl acrylate having 6 or more (e.g. 6 to 12) carbon atoms in its alkyl group is preferable.

In another preferable example of the acrylic block copolymer disclosed herein, the starting monomers corresponding to all the monomer units constituting the acrylic block copolymer comprise methyl methacrylate (MMA) and 2-ethylhexyl acrylate (2EHA) at a mass ratio (MMA/2EHA) of their contents of 4/96 to 90/10. An acrylic block copolymer with the mass ratio being 7/93 to 70/30 is preferable, a species with 10/90 to 50/50 is more preferable, a species with 15/85 to 40/60 is yet more preferable, and a species with 15/85 to 30/70 (e.g. 15/85 to 25/75) is particularly preferable. When the MMA content is high, the adhesive strength tends to decrease, likely providing easy-release properties. When the 2EHA content is high, the organic dirt-collecting ability tends to increase.

The composition of monomer units constituting an acrylic block copolymer can be determined based on the results of NMR analysis. In particular, the NMR analysis can be carried out, using, for instance, "AVAVCEIII-600 (with Cryo Probe)" available from Bruker Biospin as the NMR system, under the conditions shown below. For instance, the mass ratio of MMA to 2EHA in the starting monomers can be determined based on the ratio of integrated intensities of peaks at 4.0 ppm (2EHA1) and 3.6 ppm (MMA1) in the $^1$H NMR spectrum.

[NMR Analysis Conditions]
    Measurement frequency: $^1$H; 600 MHz
    Flip angle: 30°
    Measurement solvent: $CDCl_3$
    Measurement temperature: 300 K
    Standard chemical shift: measurement solvent ($CDCl_3$, $^1$H: 7.25 ppm)

In the art disclosed herein, the weight average molecular weight (Mw) of the acrylic block copolymer is not particularly limited. For instance, a species having a Mw of about $3\times10^4$ to $30\times10^4$ can be preferably used. Usually, the acrylic block copolymer has a Mw in a range of preferably about $3.5\times10^4$ to $25\times10^4$ or more preferably in a range of about $4\times10^4$ to $20\times10^4$ (e.g., $4.5\times10^4$ to $15\times10^4$). A higher Mw of the acrylic block copolymer is advantageous from the standpoint of increasing the adhesive properties (e.g. cohesion) and increasing the organic dirt-collecting ability. With increasing Mw of the acrylic block copolymer, the amount of plasticizer that can be suitably included tends to increase. On the other hand, a low Mw of the acrylic block copolymer is advantageous from the standpoint of reducing the viscosity (melt viscosity) of the PSA. Lower melt viscosity of the PSA is particularly meaningful when the PSA is a hot melt type.

The Mw of an acrylic block copolymer herein refers to the value based on standard polystyrene that is determined by gel permeation chromatography (GPC) with respect to a sample prepared by dissolving the copolymer in tetrahydrofuran (THF). In particular, the GPC measurement can be performed, using, for instance, trade name "HLC-8120GPC" available from Tosoh Corporation as the GPC measurement system, under the conditions shown below.

[GPC Measurement Conditions]
    Columns: available from Tosoh Corporation, TSK gel Super HZM-H/HZ4000/HZ3000/HZ2000
    Column size: 6.0 mm I.D.×150 mm each
    Eluent: THF
    Flow rate: 0.6 mL/min
    Detector: differential refractometer (RI)
    Column temperature (measurement temperature): 40° C.
    Sample concentration: about 2.0 g/L (THF solution)
    Sample injection volume: 20 µL In the acrylic block copolymer in the art disclosed herein, a monomer (other monomer) other than an alkyl acrylate and an alkyl methacrylate may be copolymerized. Examples of the other monomer include vinyl compounds having functional groups such as alkoxy group, epoxy group, hydroxyl group, amino group, amide group, cyano group, carboxyl group, acid anhydride group, etc.; vinyl esters such as vinyl acetate; aromatic vinyl compounds such as styrene; vinyl group-containing heterocyclic compounds such as N-vinylpyrrolidone and the like. Alternatively, it can be an alkyl acrylate having a structure with an acryloyl group coupled to a fluorinated alkyl group, a fluorinated alkyl acrylate and a fluorinated alkyl methacrylate. The other monomer may be used, for instance, to adjust the properties (adhesive properties, ease of molding, etc.) of the PSA layer and its content is suitably 20% by mass or less (e.g. 10% by mass or less, typically 5% by mass or less) of all the monomers constituting the acrylic block copolymer. In a preferable embodiment, the acrylic block copolymer is essentially free of the other monomers. For instance, in a preferable acrylic block copolymer, the other monomer content is less than 1% by mass (typically 0 to 0.5% by mass) of all monomers or under the detection limit.

Such an acrylic block copolymer can be readily synthesized by a known method (e.g. see Japanese Patent Application Publication Nos. 2001-234146 and H11-323072), or a commercial product is readily available. Examples of the commercial product include trade name "LA POLYMER" series (e.g., those with product numbers LA2140e, LA2250, etc.) available from Kuraray Co., Ltd., trade name "NABSTAR" available from Kaneka Corporation, and the like. As the method for synthesizing the acrylic block copolymer, living polymerization method can be preferably employed. According to living polymerization, while keeping the weatherability inherent in the acrylic polymer, because of the excellent structure control unique to the living polymerization, an acrylic block copolymer having excellent thermoplasticity can be synthesized. Since the molecular weight distribution can be controlled in a narrow range, insufficient cohesion caused by the presence of low molecular weight components can be reduced to obtain an easily releasable PSA (and thereby a PSA sheet (dirt-collecting member)).

In the art disclosed herein, for the acrylic block copolymer, solely one species or a combination of two or more species can be used. For instance, an acrylic block copolymer (H) that has a relatively high Mw and an acrylic block copolymer (L) that has a lower Mw than the acrylic block copolymer (H) can be used at a suitable mass ratio. By this, while curbing the increase in viscosity (melt viscosity) of the PSA, the organic dirt-collecting ability can be effectively increased. From the standpoint of obtaining greater effects of the combined use of the acrylic block copolymer (H) and acrylic block copolymer (L), they are preferable used so that the mass ratio (H/L) of acrylic block copolymer (H) to acrylic block copolymer (L) is in a range of 5/95 to 95/5 (preferably 10/90 to 90/10).

Each of the acrylic block copolymers used in such combination preferably has a Mw in a range of $3\times10^4$ to $30\times10^4$. For example, a preferable combination includes an acrylic block copolymer (H) having a Mw in a range of $5\times10^4$ to $20\times10^4$ (e.g. $7\times10^4$ to $20\times10^4$) and an acrylic block copolymer (L) having a Mw in a range of $3\times10^4$ to $8\times10^4$ and lower than the Mw of the acrylic block copolymer (H). A more preferable example of the combination includes an acrylic block copolymer (H) having a Mw in a range of $6\times10^4$ to $15\times10^4$ (e.g. $7\times10^4$ to $15\times10^4$) and an acrylic block copolymer (L) having a Mw in a range of $4\times10^4$ to $6\times10^4$ and lower than the Mw of the acrylic block copolymer (H).

The mass ratio (H/L) of these acrylic block copolymers can be, for instance, 40/60 to 90/10, or it is preferably 45/65 to 85/15.

The inclusion (presence) of two or more species of acrylic block copolymer with different Mw values, the Mw values of the respective copolymers and their mass ratio can be assessed, for instance, through the GPC measurement described earlier.

The PSA in the art disclosed herein preferably comprises a plasticizer. The inclusion of plasticizer increases the ease of release. It also lowers the melt viscosity of the PSA and thus the application is further facilitated. In yet another aspect, the inclusion of plasticizer also increases the organic dirt-collecting ability on the PSA surface. This can bring about, for instance, a higher removal rate of sebum dirt.

With the inclusion of plasticizer in the PSA, the organic dirt collected on the PSA surface is absorbed into the PSA (e.g. PSA layer) and dispersed therein. Thus, even when the dirt-collecting ability is reduced by repeated use, the dirt-collecting ability may recover in relatively short time (e.g. several minutes or several hours) as a unique effect (dirt-collecting ability recovery effect).

The dirt-collecting ability recovery effect is described with reference to FIG. 5. As schematically illustrated in FIG. 5, when the PSA layer 32 in dirt-collecting member (PSA sheet) 31 is allowed to make contact with a surface 2 of an article 1 such as a portable device, etc., the PSA layer 32 collects organic dirt 50 stuck on the surface 2. The PSA layer 32 has a property to not only collect organic dirt 50, but also causes it to migrate into the layer. Thus, the organic dirt 50 stuck on the surface of PSA layer 32 migrates with time into the PSA layer 32, leading to a lower presence of organic dirt 50 on the surface of PSA layer 32; and eventually, the surface of PSA layer 32 will be essentially free of the presence of organic dirt 50. In other words, the surface regains the same state as before the sticky cleaner is used. Accordingly, the term "recovery effect" refers to an effect such that when the PSA collects organic dirt and the dirt-collecting ability is temporarily reduced, the dirt-collecting ability recovers in a prescribed time period (e.g. several minutes, preferably several hours) and the PSA (e.g. PSA layer) regains the ability to collect dirt. It encompasses that the dirt-collecting ability requires short time for recovery.

Examples of plasticizer include phthalic acid esters such as dioctyl phthalate, diisononyl phthalate, diisodecyl phthalate, dibutyl phthalate, etc.; adipic acid esters such as dioctyl adipate, diisononyl adipate, etc.; trimellitic acid esters such as trioctyl trimellitate, etc.; sebacic acid esters; epoxidized vegetable oils such as epoxidized soybean oil and epoxidized flax seed oil; epoxidized fatty acid alkyl esters such as epoxidized fatty acid octyl esters; cyclic fatty acid esters such as sorbitan monolaurate, sorbitan monostearate, sorbitan monooleate, sorbitan trioleate and their ethylene oxide adducts as well as their derivatives; and the like. These can be used singly as one species or in a combination of two or more species. Preferable examples of plasticizer among them include adipic acid esters, epoxidized vegetable oils and epoxidized fatty acid alkyl esters. In particular, adipic acid esters are preferable.

When such plasticizer is included, for instance, in a PSA that comprises, as the base polymer, an acrylic block copolymer having as the soft segment (B) an Ac block comprising an alkyl acrylate having 6 or more (6 to 12) carbon atoms in its alkyl group, it may bring about the effect to decrease the melt viscosity and adhesive strength of the PSA and the effect to increase the organic dirt-collecting ability at a high level.

The amount of plasticizer added is not particularly limited. From the standpoint of reducing the melt viscosity, providing easy-release properties, increasing the dirt-collecting ability, etc., the amount of plasticizer added to 100 parts by mass of the base polymer (acrylic block copolymer) is, for instance, suitably 1 part by mass or greater. Its amount added is preferably 5 parts by mass or greater, more preferably 10 parts by mass or greater, yet more preferably 15 parts by mass or greater, or particularly preferably 20 parts by mass or greater. From the standpoint of preventing the plasticizer from bleeding out, etc., its amount added is suitably 150 parts by mass or less, preferably 120 parts by mass or less, more preferably 100 parts by mass or less, yet more preferably 80 parts by mass or less, or particularly preferably 60 parts by mass or less. For instance, in a PSA that comprises as the base polymer an acrylic block copolymer that has as the soft segment (B) an Ac block comprising an alkyl acrylate having 6 or more (e.g. 6 to 12) carbon atoms in its alkyl group (e.g. an Ac block comprising the alkyl acrylate as the primary monomer), the amount of plasticizer added is, for instance, preferably 10 to 80 parts by mass (e.g. 20 to 70 parts by mass, typically 25 to 60 parts by mass) relative to 100 parts by mass of the base polymer.

The PSA in the art disclosed herein may include a tackifier as necessary. The addition of the tackifier may be beneficial in increasing the thermoplasticity (e.g. reducing the melt viscosity) of the PSA. As the tackifier, tackifier resins commonly known in the field of acrylic PSA and the like can be used. Examples include a hydrocarbon-based tackifier resin, terpene-based tackifier resin, rosin-based tackifier resin, phenolic tackifier resin, epoxy-based tackifier resin, polyamide-based tackifier resin, elastomer-based tackifier resin and ketone-based tackifier resin. These can be used singly as one species or in a combination of two or more species.

Examples of the hydrocarbon-based tackifier resin include various hydrocarbon-based resins such as aliphatic hydrocarbon resins, aromatic hydrocarbon resins (xylene resins, etc.), alicyclic hydrocarbon resins, aliphatic-aromatic petroleum resins (styrene-olefin-based copolymers, etc.), aliphatic-alicyclic petroleum resins, hydrogenated hydrocarbon resins, coumarone-based resins, coumarone-indene-based resins, and the like. Examples of the terpene-based tackifier resin include terpene-based resins such as α-pinene polymers, β-pinene polymers, etc.; modified terpene-based resins (e.g. terpenophenolic resins, styrene-modified terpene-based resins, hydrogenated terpene-based resins, hydrogenated terpenophenolic resins, etc.) obtained by subjecting these terpene-based resins to modification (phenol modification, aromatic modification, hydrogenation modification, etc.); and so on. Examples of the rosin-based tackifier resin include unmodified rosins (raw rosins) such as gum rosin, wood rosin, etc.; modified rosins (hydrogenated rosins, disproportioned rosins, polymerized rosins, other chemically modified rosins, etc.) obtained by subjecting these unmodified rosins to hydrogenation, disproportionation, polymerization, etc.; various other rosin derivatives; and so on. Examples of phenolic tackifier resins include resol-type and novolac-type alkylphenolic resins. Preferable tackifiers among these are terpene-based resins, modified terpene-based resins and alkylphenolic resins.

The softening point of the tackifier is not particularly limited. From the standpoint of reducing the melt viscosity, it is preferably 160° C. or lower, or more preferably 140° C. or lower. From the standpoint of avoiding an excessive increase in adhesive strength, it is preferably 60° C. or higher, or more preferably 80° C. or higher.

The amount of tackifier added is not particularly limited. From the standpoint of avoiding an excessive increase in adhesive strength, for instance, to 100 parts by mass of the base polymer (acrylic block copolymer), it can be 50 parts by mass or less, or it is usually suitably 40 parts by mass or less, or preferably 30 parts by mass or less. From the standpoint of obtaining greater effects of the tackifier (e.g. the effect to reduce the melt viscosity), the amount added to 100 parts by mass of the base polymer is suitably, for instance, 1 part by mass or greater. Alternatively, the PSA may be essentially free of such a tackifier.

In addition to the acrylic block copolymer (base polymer), the PSA in the art disclosed herein may comprise, as an optional component, other polymer or oligomer that is not an acrylic block copolymer, for instance, for purposes of adjusting the viscosity (e.g. reducing the melt viscosity) of the PSA, controlling the adhesive properties (e.g. reducing the adhesive strength) and so on. As such a polymer or oligomer (or an optional polymer hereinafter), for instance, an acrylic random copolymer having a Mw of about 500 to 10000 (typically about 800 to 5000) can be used.

The amount of the optional polymer added is, relative to 100 parts by mass of the acrylic block copolymer, for instance, suitably 50 parts by mass or less, preferably 10 parts by mass or less, or more preferably 5 parts by mass or less. In a preferable embodiment, the PSA layer may be essentially free of other polymer that is not an acrylic block copolymer. In a preferable PSA layer, the amount of the other polymer that is not an acrylic block copolymer is less than 1% by mass (typically 0 to 0.5% by mass) relative to 100 parts by mass of the acrylic block copolymer.

The PSA in the art disclosed herein can include various additives known in the PSA field as well, such as tackifier, surfactant, chain transfer agent, anti-aging agent, antioxidant, UV ray absorber, photostabilizer, antistatic agent, colorant (pigment, dye, etc.) and so on. The types and amounts of these non-essential additives can be the same as usual types and amounts in this type of PSA.

When the PSA is formed as a PSA layer placed on or above a support substrate, the formation method is not particularly limited. For instance, it is preferable to apply a method where a PSA (thermoplastic PSA) heated into a molten state is directly applied to a support substrate by a heretofore known application means such as a roll coater, die coater, gravure coater, etc.; and the PSA is allowed to cool to near room temperature to form a PSA layer. In this case, the PSA is typically provided to the substrate, in a form of PSA essentially free of an organic solvent (i.e. solvent-free PSA). While the PSA can be crosslinked by a suitable means after provided to the support substrate, it is usually easy and preferable to use it as a non-crosslinked PSA (i.e. thermoplastic PSA) without applying a special crosslinking means.

The PSA disclosed herein may be formed as a PSA layer by applying (typically at room temperature) to the support substrate the PSA in a form of PSA composition in which the PSA is dissolved or dispersed in a suitable liquid medium and allowing the applied composition to dry. The PSA composition can be, for instance, a solvent-based PSA composition where the PSA disclosed herein is dissolved in an organic solvent, a water-dispersed PSA composition where the PSA is dispersed in water, and so on. As the organic solvent, general organic solvents can be used, such as ethyl acetate, toluene, hexane and ethanol. For the organic solvent, solely one species or a combination of two or more species can be used. The PSA composition may comprise, but not particularly limited to, for instance, about 30 to 70% by mass of solvent(s) (typically organic solvent(s)). Instead of directly applying the PSA composition to the support substrate, the PSA layer may be placed on the support substrate by applying the composition to a releasable surface (release face) and allowing it to dry to form a PSA layer on the release face and adhering the PSA layer to a non-releasable surface of the support substrate.

From the standpoint of the ease of application, the PSA disclosed herein suitably has, but not particularly limited to, a melt viscosity at 180° C. of 200 Pa·s or lower, preferably 100 Pa·s or lower, or more preferably 50 Pa·s or lower (typically 20 Pa·s or lower, e.g. 10 Pa·s or lower). The lower limit of the melt viscosity at 180° C. is not particularly limited. In view of the balance between the ease of application and adhesive properties, it is usually suitably 0.1 Pa·s or higher, preferably 1 Pa·s or higher, for instance, preferably 5 Pa·s or higher.

Herein, the melt viscosity can be measured by the following melt viscosity measurement method.

[Melt Viscosity Measurement Method]

Measurement device: programmable viscometer (DV-II+ Pro) available from Brookfield Engineering Measurement conditions: measurement temperature 180° C., speed of rotation 2.5 rpm, spindle SC4-27

Measurement procedure: 14 g of PSA is placed in a sample chamber and heated to melt at 180° C. The spindle is immersed in the molten PSA and rotated. A melt viscosity reading is taken at 30 minutes from the start of the rotation.

The thickness of the PSA layer can be suitably selected in accordance with the purpose and is not particularly limited. From the standpoints of making sufficient use of the dirt-collecting ability and of increasing the recovery of the dirt-collecting ability, the thickness of the PSA layer is preferably about 10 μm or larger (e.g. 20 μm or larger, preferably 30 μm or larger, typically 40 μm or larger). When it is important to reduce the weight or size, etc., the thickness of the PSA layer is preferably 300 μm or smaller (e.g. 100 μm or smaller, preferably 70 μm or smaller, typically 60 μm or smaller). The PSA layer may be formed entirely over one face of the support substrate. Alternatively, for instance, a non-sticky region (dry edge) free of the PSA layer may be included along each edge of the support substrate's width direction.

When the dirt-collecting member disclosed herein comprises a support substrate as in this embodiment, as the support substrate, materials formed with various types of synthetic resin, non-woven fabric or paper can be used. The material of the support substrate can be a fabric, rubber sheet, foam sheet, metal foil, a composite of these, etc.

Examples of synthetic resin include a polyolefin (polyethylene, polypropylene, ethylene-propylene copolymers, etc.), polyester (polyethylene terephthalate, etc.), vinyl chloride resin, vinyl acetate resin, polyimide resin, polyamide resin, fluorocarbon resin, and the like. In particular, a support substrate made of polyethylene terephthalate (PET) can be preferably used. Examples of paper include Japanese paper (washi), kraft paper, glassine paper, high-grade paper, synthetic paper, top-coated paper, and the like. Examples of a fabric include a woven fabric and a non-woven fabric of a single species or a blend, etc., of various fibrous substances. Examples of the fibrous substance include cotton, staple fiber, Manila hemp, pulp, rayon, acetate fiber, polyester fiber, polyvinyl alcohol fiber, polyamide fiber, polyolefin fiber, and the like. Examples of a rubber sheet include a natural rubber sheet, a butyl rubber sheet, and the like. Examples of a foam sheet include a polyurethane foam sheet, a polychloroprene rubber foam sheet, and the like. Examples of metal foil include aluminum foil, copper foil, and the like. The support substrate may contain as necessary various additives such as filler (inorganic filler, organic filler, etc.), anti-aging agent, antioxidant, UV ray absorber, photostabilizer, anti-static agent, lubricant, plasticizer, colorant (pigment, dye, etc.), and the like.

When the dirt-collecting member is a single-faced PSA sheet having a PSA layer formed on a single face of a support substrate, the back face (PSA layer-free face) of the support substrate is preferably subjected to a surface treatment such as coating of a silicone-based release agent and the like to adjust the unwinding force of the PSA sheet roll to a suitable range (typically a release treatment to prevent the unwinding force from becoming excessively high).

The thickness of the support substrate can be suitably selected in accordance with the purpose and is not particularly limited. In general, the thickness is preferably about 20 µm or larger (e.g. 30 µm or larger, typically 35 µm or larger), but suitably about 200 µm or smaller (more preferably 100 µm or smaller, typically 70 µm or smaller, e.g. 50 µm or smaller).

In the dirt-collecting member (e.g. a PSA sheet), the part (e.g. PSA layer-side surface) that makes contact with the surface to be cleaned may exhibit an adhesive strength of, for instance, 2 N/25 mm or less (typically 1 N/25 mm or less). The adhesive strength is preferably less than 1 N/25 mm. This means that the dirt-collecting member is easy-release. A cleaner having such an easy-release dirt-collecting member provides excellent dirt-removing workability since it requires little force to do the dirt-removing work on the surface. More specifically, the cleaner can be moved more smoothly on the surface (surface to be cleaned) of an article. For instance, it has advantages such that the cleaner can be easily separated from the surface after the dirt-removing operation. Even when the surface of the article (e.g. display of a tablet terminal) is covered with removable protection film (e.g. protection film made of a silicone-based or polyester-based synthetic resin, etc.), because of the easy-release nature, the protection film is less likely to peel off the article while cleaning the article's surface covered with the protection film (i.e. the surface of the protection film). Thus, there is an advantage that the cleaning can be easily carried out while keeping the article's surface covered with the protection film. In this case, the surface to be cleaned is the protection film surface and such a surface is included in the concept of the article's surface referred to herein.

From the standpoint of the dirt-removing workability, the adhesive strength is, as described earlier, preferably less than 1 N/25 mm, more preferably 0.80 N/25 mm or less, or yet more preferably 0.60 N/25 mm or less. From the standpoint of the maneuverability in cleaning protective film surfaces, etc., the adhesive strength is suitably 0.50 N/25 mm or less, preferably 0.30 N/25 mm or less, more preferably 0.20 N/25 mm or less, or particularly preferably less than 0.10 N/25 mm.

From the standpoint of the dirt-collecting ability, the adhesive strength is usually suitably 0.001 N/25 mm or greater (typically 0.005 N/25 mm or greater), preferably 0.01 N/25 mm or greater, more preferably 0.02 N/25 mm or greater, or yet more preferably 0.03 N/25 mm or greater.

Herein, the adhesive strength refers to the 180° peel strength measured based on the following 180° peel test, using a stainless steel (SUS) plate as the adherend.

[180° Peel Test]
(1) As the test plate (adherend), a SUS304 steel plate polished with water-resistant sandpaper is used. The dimensions of the test plate is 2 mm or greater in thickness, about 50 mm in width and about 125 mm in length. The test plate is polished over its entire length evenly in the length direction with #360 water-resistant sandpaper.
(2) Before the adhesive strength measurement, the test plate polished with the water-resistant sandpaper is cleaned. In the cleaning procedure, the surface of the test plate is wiped with a wipe wet with reagent-grade toluene and further wiped vigorously with a dry wipe until the surface of the test plate dries out. Such cleaning procedure is repeated three times or more until the surface of the test plate is visually considered clean.
(3) The cleaned test plate (SUS plate) is left standing at a temperature of 23±2° C. and 50% relative humidity (RH) for five minutes or more and then used for the adhesive strength measurement.
(4) The dirt-collecting member (typically a PSA sheet) is cut into a rectangular sheet to obtain a test piece. The test piece is preferably about 100 mm to 300 mm long and about 15 mm to 30 mm wide. When the width is not 25 mm, the 180° peel strength (N/25 mm) is determined (converted) based on the ratio of actual width to 25 mm. The thickness of the test piece is not particularly limited.
(5) The resulting test piece is applied over its adhesive face (e.g. PSA layer-side surface) to the test plate (SUS plate) with a 2 kg roller moved back and forth once. When the test piece is adhesive over each face such as in a double-faced PSA sheet, it is preferable to apply about 25 µm thick polyethylene terephthalate (PET) film for backing to the surface opposite from the measured face.
(6) The resultant is stored in an environment at 23° C. and 50% RH for 30 minutes. Then, using a tensile tester, based on JIS Z0237, in an environment at 23° C. and 50% RH, 180° peel strength to the SUS plate (to-SUS 180° peel strength) (N/25 mm) is measured at a peel angle of 180°, at a tensile speed of 300 mm/min. The tensile tester is not particularly limited. A heretofore known tensile tester can be used. For instance, measurements can be made with trade name "TENSILON" available from Shimadzu Corporation.

In the dirt-collecting member (e.g. a PSA sheet) disclosed herein, the part (e.g. adhesive face) that makes contact with the surface to be cleaned may have, but not particularly limited to, a 180° peel strength to glass of less than 1 N/25 mm (more preferably 0.80 N/25 mm or less, yet more preferably 0.60 N/25 mm or less). A cleaner having such an easy-release dirt-collecting member provides excellent dirt-removing workability. The adhesive strength is suitably 0.50 N/25 mm or less, preferably 0.30 N/25 mm or less, more preferably 0.20 N/25 mm or less, or particularly preferably less than 0.10 N/25 mm. From the standpoint of the dirt-collecting ability, the adhesive strength is usually suitably 0.001 N/25 mm or greater (typically 0.005 N/25 mm or greater), preferably 0.01 N/25 mm or greater, more preferably 0.02 N/25 mm or greater, or yet more preferably 0.03 N/25 mm or greater. The 180° peel strength to the glass plate (180° peel strength to glass) can be measured similarly to the measurement of the 180° peel strength to SUS except that the glass plate (e.g. a commercial float glass plate) is used as the adherend.

In the dirt-collecting member (e.g. a PSA sheet) disclosed herein, the part (e.g. adhesive face) that makes contact with the surface to be cleaned may have, but not particularly limited to, a 180° peel strength to polyethylene terephthalate (PET) film of less than 1 N/25 mm (more preferably 0.80 N/25 mm or less, or yet more preferably 0.60 N/25 mm or less). A cleaner having such an easy-release dirt-collecting member provides excellent dirt-removing workability. From the standpoint of the maneuverability in cleaning protective film surfaces, etc., the adhesive strength is suitably 0.50 N/25 mm or less, preferably 0.30 N/25 mm or less, more preferably 0.20 N/25 mm or less, or particularly preferably less than 0.10 N/25 mm. From the standpoint of the dirt-collecting ability, the adhesive strength is usually suitably 0.001 N/25 mm or greater (typically 0.005 N/25 mm or greater), preferably 0.01 N/25 mm or greater, more preferably 0.02 N/25 mm or greater, or yet more preferably 0.03 N/25 mm or greater. The 180° peel strength to PET film (180° peel strength to PET) can be measured similarly to the measurement of the 180° peel strength to SUS except that PET film is used as the adherend.

When the sticky cleaner disclosed herein has a PSA sheet roll, the PSA sheet roll is preferably constituted to deter rail drawing. Herein, the rail drawing refers to a phenomenon such that when the sheet roll is rolled (rotated) reversely to the winding direction (typically in a direction in which the wound single-faced PSA sheet is peeled) on the surface to be cleaned, a band of the PSA sheet is left stuck on the surface being cleaned, beginning from the outer circumferential end of the roll. Reduced occurrence of rail drawing allows for stress-free, smooth rotation of the roll on the surface being cleaned, leading to great usability. In addition, it can also prevent wasteful use of the PSA sheet due to the occurrence of rail drawing (i.e. waste of the sheet due to unintentional adhesion of the PSA sheet to the surface).

For instance, in the PSA sheet, the adhesive strength (e.g. the value measured based on the 180° peel test) and the unwinding force are preferably at a balance so as to inhibit the occurrence of rail drawing on the surface (e.g. a surface made of glass such as aluminosilicate glass or a synthetic resin) being cleaned. The unwinding force herein refers to the force required to pull out the PSA sheet from the PSA sheet roll (i.e. resistive force against unwinding). The unwinding force can be perceived as the adhesive strength to the back face of the PSA sheet (typically the back face of the support substrate). For instance, when the unwinding force is excessively low as compared with the adhesive strength, if the PSA sheet roll is rotated on the surface being cleaned, the unwinding force may succumb to the adhesive strength between the PSA sheet (typically the PSA layer) and the surface being cleaned to cause rail drawing. On the other hand, an excessively high unwinding force tends to result in unsmooth unwinding of the PSA sheet.

The unwinding force can be assessed as follows. In particular, the PSA sheet roll is set in a prescribed tensile tester. In an environment at a temperature of 23° C. and 50% RH, the outer circumferential end of the wound PSA sheet is mounted to the chuck of the tester and pulled at a rate of 300 mm/min to unwind the PSA sheet roll in the tangential direction. The unwinding force during this can be converted to and determined as the value per width (e.g. 150 mm) of PSA layer of the PSA sheet (N/150 mm). For instance, a preferable PSA sheet roll has an unwinding force of about 0.5 N/150 mm to 2.5 N/150 mm.

Several working examples related to the present invention are described below although the present invention is not to be limited to these specific examples. In the following explanation, the terms "parts" and "%" are by mass unless specifically stated otherwise.

[Acrylic Block Copolymer]

In the examples shown below, as the acrylic block copolymer, the following acrylic polymers A to C synthesized by a known living anionic polymerization method were used.

(Acrylic Polymer A)

As the acrylic polymer A, was used an acrylic block copolymer having a triblock structure of poly(methylmethacrylate (MAA)) block-poly(2-ethylhexyl acrylate (2EHA)/n-butylacrylate (BA)) block-polyMMA block (or "MMA-2EHA/BA-MAA" hereinafter). This copolymer had a 2EHA to BA weight ratio (i.e. copolymerization ratio by weight) of 50/50 in the poly(2EHA/BA) block and a ratio ((2EHA+BA)/MMA) of weight of poly(2EHA/BA) block to weight of polyMMA block (combined weight of the two polyMMA blocks) of 82/18, a Mw of $10\times10^4$ and a Mn of $8.4\times10^4$ at a Mw/Mn of 1.21.

(Acrylic Polymer B)

As the acrylic polymer B, was used an acrylic block copolymer having a triblock structure of MMA-2EHA/BA-MMA. This copolymer had a 2EHA to BA weight ratio of 50/50 in the poly(2EHA/BA) block, a ratio ((2EHA+BA)/MMA) of weight of poly(2EHA/BA) block to weight of polyMMA block (combined weight of the two polyMMA blocks) of 81/19, a Mw of $5\times10^4$ and a Mn of $4.4\times10^4$ at a Mw/Mn of 1.13.

(Acrylic Polymer C)

As the acrylic polymer C, was used a commercial acrylic block copolymer under trade name "LA POLYMER LA2140e" (available from Kuraray Co., Ltd.) having a triblock structure of polyMMA block-poly(n-butylacrylate (BA)) block-polyMMA block (or "MMA-BA-MMA" hereinafter). This copolymer had a ratio (BA/MMA) of weight of polyBA block to weight of polyMMA block (combined weight of the two polyMMA blocks) of 78/22 and a Mw of $8\times10^4$ and a Mn of $6\times10^4$ at a Mw/Mn of 1.3.

EXAMPLE 1

The acrylic polymer A heated into a molten state was applied to a surface of a 38 μm thick PET support substrate sheet (width: approximately 8 cm) to fabricate a single-faced PSA sheet having a PSA layer of about 50 μm in thickness (adhesive thickness) formed on one face of the support substrate. The resulting single-faced PSA sheet was wound around the surface of a drum-shaped holding member (20 mm diameter) to form a PSA sheet roll. The holding member was installed on an end of a grip member in a freely rotatable (rolling) manner to construct a cleaner as schematically shown in FIGS. 1 and 2.

EXAMPLE 2

Using the acrylic polymer B in place of the acrylic polymer A, but otherwise in the same manner as Example 1, a cleaner according to this example was constructed.

EXAMPLE 3

100 parts of the acrylic polymer A and 30 parts of a plasticizer "MONOCIZER W-242" (diisononyl adipate) available from DIC Corporation were mixed to prepare a hot melt acrylic PSA. The acrylic PSA in a molten state was applied to a surface of a 38 μm thick PET support substrate sheet (width: approximately 8 cm) to fabricate a single-faced PSA sheet in which a PSA layer of about 50 μm thickness is formed on one face of the support substrate. Using this single-faced PSA sheet, but otherwise in the same manner as Example 1, a cleaner according to this example was constructed.

EXAMPLE 4

Using the acrylic polymer B in place of the acrylic polymer A, but otherwise in the same manner as Example 3, a cleaner according to this example was constructed.

EXAMPLE 5

In this example, as the acrylic polymer, the acrylic polymer A and acrylic polymer B were used at a mass ratio of 50:50. 100 parts of the acrylic polymer (comprising 50 parts of the acrylic polymer A and 50 parts of the acrylic polymer B) and 30 parts of plasticizer "MONOCIZER W-242" were mixed to prepare a hot melt acrylic PSA. Otherwise in the same manner as Example 3, a cleaner according to this example was constructed.

EXAMPLE 6 TO 8

As the plasticizer, in place of "MONOCIZER W-242," "RHEODOL SP-O30V" (sorbitan trioleate) available from Kao Corporation was used. Otherwise in the same manner as Examples 3 to 5, cleaners according to Examples 6 to 8 were constructed.

EXAMPLE 9 TO 10

Using the acrylic polymer C in place of the acrylic polymer A, but otherwise in the same manner as Example 3 and Example 6, cleaners according to Example 9 and Example 10 were constructed, respectively.

EXAMPLE 11

An acrylic polymer D was synthesized by a solution polymerization method. In particular, into a three-neck flask, were placed toluene as a polymerization solvent, 2EHA and acrylic acid (AA) as monomers at a 2EHA:AA mass ratio of 95:5. The mixture was gently stirred under nitrogen flow for at least one hour. Subsequently, was added benzoyl peroxide (BPO) (available from NOF Corporation, "HYPER BW"). The mixture was heated to 60° C. and the reaction was carried out for two hours; and was further heated to 80° C. and the reaction was carried out for one hour to prepare a toluene solution of an acrylic polymer D (random copolymer of the monomers) having a weight average molecular weight (Mw) of $50 \times 10^4$ to $60 \times 10^4$.

To 100 parts of the acrylic polymer D in the toluene solution, were mixed 30 parts of plasticizer "MONOCIZER W-242", 0.1 part of an epoxy-based crosslinking agent (available from Mitsubishi Gas Chemical, Inc., "TETRAD-C") and 2 parts of an isocyanate-based crosslinking agent (available from Nippon Polyurethane Industry Co., Ltd., "CORONATE L") to prepare a solvent-based acrylic PSA composition (S1).

The acrylic PSA composition (S1) was applied to a surface of a 38 μm thick PET support substrate sheet (width: approximately 8 cm) and allowed to dry to fabricate a single-faced PSA sheet in which an approximately 50 μm thick PSA layer is formed on one face of the support substrate. Using this single-faced PSA sheet, but otherwise in the same manner as Example 1, a cleaner according to this example was constructed.

EXAMPLE 12

The amount of plasticizer "MONOCIZER W-242" was changed to 60 parts and the amount of the epoxy-based crosslinking agent "TETRAD-C" was changed to 0.5 part. Otherwise in the same manner as Example 11, a solvent-based acrylic PSA composition (S2) was prepared. Using this PSA composition (S2), but otherwise in the same manner as Example 11, a cleaner according to this example was constructed.

EXAMPLE 13

The amount of plasticizer "MONOCIZER W-242" was changed to 50 parts relative to 100 parts of the acrylic polymer. Otherwise in the same manner as Example 5, a cleaner according to this example was constructed.

EXAMPLE 14

To 100 parts of the acrylic polymer, 5 parts of a tackifier (a terpenophenolic resin "K-125" available from Yasuhara Chemical Co., Ltd.) was further mixed in. Otherwise in the same manner as Example 13, a cleaner according to this example was constructed.

EXAMPLE 15 TO 17

The tackifier "K-125" was used in amounts of 10 parts (Example 15), 15 parts (Example 16) and 20 parts (Example 17), but otherwise in the same manner as Example 14, cleaners according to Examples 15 to 17 were constructed, respectively.

EXAMPLE 18

In place of plasticizer "MONOCIZER W-242," a plasticizer "EPOCIZER W-121" (epoxidized fatty acid) available from DIC Corporation was used. Otherwise in the same manner as Example 13, a cleaner according to this example was constructed.

EXAMPLE 19

In place of plasticizer "MONOCIZER W-242," a plasticizer "EPOCIZER W-100-EL" (epoxidized soybean oil) available from DIC Corporation was used. Otherwise in the same manner as Example 13, a cleaner according to this example was constructed.

EXAMPLE 20

In this example, as the acrylic polymer, the acrylic polymer A and acrylic polymer B were used at a mass ratio of 80:20. Were mixed 100 parts of the acrylic polymer (comprising 80 parts of the acrylic polymer A and 20 parts of the acrylic polymer B), 70 parts of plasticizer "MONOCIZER W-242" and 30 parts of a tackifier (hydrogenated terpenophenolic resin "UH-115" available from Yasuhara Chemical Co., Ltd.) to prepare a hot melt acrylic PSA. Otherwise in the same manner as Example 3, a cleaner according to this example was constructed.

EXAMPLE 21

Were mixed 100 parts of the same acrylic polymer as Example 20 (comprising 80 parts of the acrylic polymer A and 20 parts of the acrylic polymer B), 50 parts of plasticizer "MONOCIZER W-242," 20 parts of tackifier "UH-115," and 20 parts of an acrylic oligomer ("UP-1000" available from Toagosei Co., Ltd., functional group-free type, Mw about 3000) to prepare a hot melt acrylic PSA. Otherwise in the same manner as Example 3, a cleaner according to this example was constructed.

EXAMPLE 22

Were mixed 100 parts of the same acrylic polymer as Example 20 (comprising 80 parts of the acrylic polymer A and 20 parts of the acrylic polymer B), 50 parts of plasticizer "MONOCIZER W-242," and 15 parts of tackifier "UH-115" to prepare a hot melt acrylic PSA. The melt viscosity of the acrylic PSA measured at 180° C. according to the melt viscosity measurement method described above was about 10 Pa·s. Using this acrylic PSA, but otherwise in the same manner as Example 3, a cleaner according to this example was constructed.

EXAMPLE 23

Were mixed 100 parts of the same acrylic polymer as Example 20 (comprising 80 parts of the acrylic polymer A and 20 parts of the acrylic polymer B), 30 parts of plasticizer "MONOCIZER W-242," 10 parts of tackifier "UH-115" and 50 parts of acrylic oligomer "UP-1000" to prepare a hot melt acrylic PSA. Otherwise in the same manner as Example 3, a cleaner according to this example was constructed.

EXAMPLE 24

In this example, as the acrylic polymer, the acrylic polymer A and acrylic polymer B were used at a mass ratio of 65:35. Were mixed 100 parts of the acrylic polymer (comprising 65 parts of the acrylic polymer A and 35 parts of the acrylic polymer B), 70 parts of plasticizer "MONOCIZER W-242," 20 parts of tackifier "UH-115" and 50 parts of acrylic oligomer "UP-1000" to prepare a hot melt acrylic PSA. Otherwise in the same manner as Example 3, a cleaner according to this example was constructed.

EXAMPLE 25

Were mixed 100 parts of the same acrylic polymer as Example 24 (comprising 65 parts of the acrylic polymer A and 35 parts of the acrylic polymer B), 50 parts of plasticizer "MONOCIZER W-242" and 10 parts of tackifier "UH-115" to prepare a hot melt acrylic PSA. Otherwise in the same manner as Example 3, a cleaner according to this example was constructed.

EXAMPLE 26

Were mixed 100 parts of the same acrylic polymer as Example 24 (comprising 65 parts of the acrylic polymer A and 35 parts of the acrylic polymer B), 30 parts of plasticizer "MONOCIZER W-242," 30 parts of tackifier "UH-115" and 20 parts of acrylic oligomer "UP-1000" to prepare a hot melt acrylic PSA. Otherwise in the same manner as Example 3, a cleaner according to this example was constructed.

EXAMPLE 27

In this example, as the acrylic polymer, the acrylic polymer A and acrylic polymer B were used at a mass ratio of 50:50. Were mixed 100 parts of the acrylic polymer (comprising 50 parts of the acrylic polymer A and 50 parts of the acrylic polymer B), 70 parts of plasticizer "MONOCIZER W-242," 10 parts of tackifier "UH-115" and 20 parts of acrylic oligomer "UP-1000" to prepare a hot melt acrylic PSA. Otherwise in the same manner as Example 3, a cleaner according to this example was constructed.

EXAMPLE 28

Were mixed 100 parts of the same acrylic polymer as Example 27 (comprising 50 parts of the acrylic polymer A and 50 parts of the acrylic polymer B), 50 parts of plasticizer "MONOCIZER W-242," 30 parts of tackifier "UH-115" and 50 parts of acrylic oligomer "UP-1000" to prepare a hot melt acrylic PSA. Otherwise in the same manner as Example 3, a cleaner according to this example was constructed.

EXAMPLE 29

Were mixed 100 parts of the same acrylic polymer as Example 27 (comprising 50 parts of the acrylic polymer A and 50 parts of the acrylic polymer B), 30 parts of plasticizer "MONOCIZER W-242" and 20 parts of tackifier "UH-115" to prepare a hot melt acrylic PSA. Otherwise in the same manner as Example 3, a cleaner according to this example was constructed.

[Measurement of 180° Peel Strength to SUS]

Based on the 180° peel test described above, the PSA sheet according to each example was measured for 180° peel strength. In particular, the PSA sheet according to each example was cut into a 200 mm by 25 mm strip to obtain a test piece. The test piece was adhered over its sticky surface (the PSA layer surface) to a stainless steel (SUS304) plate with a 2 kg roller moved back and forth once. The resultant was stored in an environment at 23° C. and 50% RH for 30 minutes. Based on JIS Z0237, using a tensile tester, in an environment at 23° C. and 50% RH, the 180° peel strength (N/25 mm) to SUS was measured at a peel angle of 180° and at a tensile speed of 300 mm/min. Measurements were made with "TENSILON" available from Shimadzu Corporation. The results are shown in Tables 1 to 3.

[Sebum Dirt Removability Test]

(Cleaning of Protection Film Surface)

A smartphone (docomo NEXT series "Xperia® Z SO-02E" available from Sony Mobile Communications AB) was obtained, with protection film applied to its display (a smooth surface made of aluminosilicate glass). As the protection film, protection film included with a jacket (a hard coating, gradation, shell jacket available from Ray-Out Co., Ltd.) for the smartphone was used After the surface of the protection film was thoroughly wiped with a non-woven fabric wipe to remove any dirt, the protection film was measured for glossiness (blank gloss value G0) at a measurement angle of 60°, using a handy gloss meter "Gloss Checker IG-331" available from Horiba, Ltd. Subsequently, sebum components on the tester's face (cheeks) were rubbed onto fingers and the organic dirt formed of sebum components on the fingers was rubbed and transferred onto the surface of the protection film adhered on the display. The amount of the organic dirt transferred was adjusted so that the gloss value (gloss value G1 when dirty) at a measurement angle of 60° was approximately equal to the value shown in each table relative to the blank gloss value G0 (i.e. about 70% in Table 1, about 80% in Table 3).

The protection film surface with the sebum dirt was then cleaned with the cleaner according to each example. In particular, the PSA sheet roll of the cleaner according to each example was allowed to rotate once in one direction over the surface of the protection film. The rotational speed was about 0.5 m/sec and the pressure applied by the operator for the rotation was about 700 g. The cleaned protection film surface was measured for glossiness (gloss value G2 after cleaned) at a measurement angle of 60° in the same manner as above. From these measurement results, based on the next equation: sebum dirt removal rate (%)=(G2/G0)×100, the sebum dirt removal rate (%) was determined. Two measurements were taken and their average value was recorded. The results are shown in Table 1 and Table 3.

(Cleaning of Glass Surface)

A tablet terminal (iPad®, a product of Apple Inc.) was obtained. Its display (a smooth surface made of aluminosilicate glass) was thoroughly wiped with a non-woven fabric wipe to remove any dirt and then measured for glossiness (blank gloss value G0) at a measurement angle of 60°, using the gloss meter "Gloss Checker IG-331." Subsequently, sebum components on the tester's face (cheeks) were rubbed onto fingers and the organic dirt formed of sebum components on the fingers was rubbed and transferred onto the display. The amount of the organic dirt transferred was adjusted so that the gloss value (gloss value G1 when dirty) at a measurement angle of 60° was equal to approximately 50% of the blank gloss value G0.

The display with the sebum dirt was then cleaned with the cleaner according to each example. In particular, the PSA sheet roll of the cleaner according to each example was allowed to rotate once in one direction over the display. The rotational speed was about 0.5 m/sec and the pressure applied by the operator for the rotation was about 700 g. The cleaned display was measured for glossiness (gloss value G2 after cleaned) at a measurement angle of 60° in the same manner as above. From these measurement results, based on the next equation: sebum dirt removal rate (%)=(G2/G0)×100, the sebum dirt removal rate (%) was determined. Two measurements were taken and their average value was recorded. The results are shown in Table 2.

[Fingerprint Removability Test]

A smartphone was obtained with protection film adhered on the display. As the smartphone and protection film, the same pieces used in the sebum dirt removal rate test were used.

The protection film surface was thoroughly wiped with a non-woven fabric wipe to remove any dirt. Subsequently, sebum components on the tester's face (cheeks) were rubbed onto a finger (index finger) and the finger was firmly pressed on the protection film surface for two seconds to transfer the organic dirt (fingerprint) formed of sebum components on the finger to the protection film.

The protection film surface with the fingerprint was then cleaned with the cleaner according to each example. In particular, the PSA sheet roll of the cleaner according to each example was allowed to rotate three times in one direction over the protection film surface. The rotational speed was about 0.5 msec and the pressure applied by the operator for the rotation was about 700 g. The cleaned protection film surface was visually inspected and graded according to the following three levels. The results are shown in Table 1 and Table 3.

3: The fingerprint mark mostly disappeared.
2: The fingerprint mark partially disappeared.
1: The fingerprint mark faded, but did not disappear.

TABLE 1

| | | | Ex. 1 | Ex. 2 | Ex. 3 | Ex. 4 | Ex. 5 | Ex. 6 |
|---|---|---|---|---|---|---|---|---|
| PSA composition (parts) | Acrylic polymer A | MMA-2EHA/BA-MMA, Mw $10 \times 10^4$ | 100 | — | 100 | — | 50 | 100 |
| | Acrylic polymer B | MMA-2EHA/BA-MMA, Mw $5 \times 10^4$ | — | 100 | — | 100 | 50 | — |
| | Acrylic polymer C | MMA-BA-MMA, Mw $8 \times 10^4$ | — | — | — | — | — | — |
| | Acrylic polymer D | Random copolymer, Mw $50 \times 10^4$-$60 \times 10^4$ | — | — | — | — | — | — |
| | Plasticizer | W-242 | — | — | 30 | 30 | 30 | — |
| | | SP-O30V | — | — | — | — | — | 30 |
| | Crosslinking agent | TETRAD-C | — | — | — | — | — | — |
| | | CORONATE L | — | — | — | — | — | — |
| | Thickness of PSA layer (μm) | | 50 | 50 | 50 | 50 | 50 | 50 |
| Properties | Sebum dirt removal rate (%) Protection film surface (G1 = ~70%) | | 91 | 95 | 95 | 96 | 94 | 95 |
| | 180° peel strength to SUS (N/25 mm) | | 7.10 | 3.00 | 0.14 | 0.07 | 0.07 | 0.02 |
| | Fingerprint removability | | 3 | 3 | 3 | 2 | 3 | 3 |

| | | | Ex. 7 | Ex. 8 | Ex. 9 | Ex. 10 | Ex. 11 |
|---|---|---|---|---|---|---|---|
| PSA composition (parts) | Acrylic polymer A | MMA-2EHA/BA-MMA, Mw $10 \times 10^4$ | — | 50 | — | — | — |
| | Acrylic polymer B | MMA-2EHA/BA-MMA, Mw $5 \times 10^4$ | 100 | 50 | — | — | — |
| | Acrylic polymer C | MMA-BA-MMA, Mw $8 \times 10^4$ | — | — | 100 | 100 | — |
| | Acrylic polymer D | Random copolymer, Mw $50 \times 10^4$-$60 \times 10^4$ | — | — | — | — | 100 |
| | Plasticizer | W-242 | — | — | 30 | — | 30 |
| | | SP-O30V | 30 | 30 | — | 30 | — |
| | Crosslinking agent | TETRAD-C | — | — | — | — | 0.1 |
| | | CORONATE L | — | — | — | — | 2 |
| | Thickness of PSA layer (μm) | | 50 | 50 | 50 | 50 | 50 |
| Properties | Sebum dirt removal rate (%) Protection film surface (G1 = ~70%) | | 93 | 94 | 90 | 80 | 100 |
| | 180° peel strength to SUS (N/25 mm) | | 0.01 | 0.02 | 0.53 | 0.01 | 0.90 |
| | Fingerprint removability | | 1 | 1 | 2 | 1 | 3 |

TABLE 2

| | | | Ex. 11 | Ex. 12 | Ex. 13 | Ex. 14 | Ex. 15 | Ex. 16 | Ex. 17 | Ex. 18 | Ex. 19 |
|---|---|---|---|---|---|---|---|---|---|---|---|
| PSA composition (parts) | Acrylic polymer A | MMA-2EHA/BA-MMA, Mw $10 \times 10^4$ | — | — | 50 | 50 | 50 | 50 | 50 | 50 | 50 |
| | Acrylic polymer B | MMA-2EHA/BA-MMA, Mw $5 \times 10^4$ | — | — | 50 | 50 | 50 | 50 | 50 | 50 | 50 |
| | Acrylic polymer D | Random copolymer, Mw $50 \times 10^4$-$60 \times 10^4$ | 100 | 100 | — | — | — | — | — | — | — |
| | Plasticizer | W-242 | 30 | 60 | 50 | 50 | 50 | 50 | 50 | — | — |
| | | W-121 | — | — | — | — | — | — | — | 50 | — |
| | | W-100-EL | — | — | — | — | — | — | — | — | 50 |
| | Tackifier | K-125 | — | — | — | 5 | 10 | 15 | 20 | — | — |
| | Crosslinking agent | TETRAD-C | 0.1 | 0.5 | — | — | — | — | — | — | — |
| | | CORONATE L | 2 | 2 | — | — | — | — | — | — | — |
| | Thickness of PSA layer (μm) | | 50 | 50 | 50 | 50 | 50 | 50 | 50 | 50 | 50 |
| Properties | Sebum dirt removal rate (%) Glass surface (G1 = ~50%) | | 99 | 83 | 96 | 97 | 94 | 95 | 92 | 92 | 90 |
| | 180° peel strength to SUS (N/25 mm) | | 0.90 | 0.06 | 0.07 | 0.05 | 0.07 | 0.09 | 0.09 | — | — |

TABLE 3

| | | | Ex. 20 | Ex. 21 | Ex. 22 | Ex. 23 | Ex. 24 | Ex. 25 | Ex. 26 | Ex. 27 | Ex. 28 | Ex. 29 |
|---|---|---|---|---|---|---|---|---|---|---|---|---|
| PSA composition (parts) | Acrylic polymer A | MMA-2EHA/BA-MMA, Mw $10 \times 10^4$ | 80 | 80 | 80 | 80 | 65 | 65 | 65 | 50 | 50 | 50 |
| | Acrylic polymer B | MMA-2EHA/BA-MMA, Mw $5 \times 10^4$ | 20 | 20 | 20 | 20 | 35 | 35 | 35 | 50 | 50 | 50 |
| | Plasticizer | W-242 | 70 | 50 | 50 | 30 | 70 | 50 | 30 | 70 | 50 | 30 |
| | Tackifier | UH-115 | 30 | 20 | 15 | 10 | 20 | 10 | 30 | 10 | 30 | 20 |
| | Oligomer | UP-1000 | — | 20 | — | 50 | 50 | — | 20 | 20 | 50 | — |
| | Thickness of PSA layer (μm) | | 50 | 50 | 50 | 50 | 50 | 50 | 50 | 50 | 50 | 50 |
| Properties | Sebum dirt removal rate (%) Protection film surface (G1 = ~80%) | | 94 | 96 | 95 | 96 | 95 | 94 | 94 | 94 | 95 | 96 |
| | 180° peel strength to SUS (N/25 mm) | | 0.05 | 0.06 | 0.04 | 0.09 | 0.03 | 0.06 | 0.18 | 0.04 | 0.06 | 0.17 |
| | Fingerprint removability | | 2 | 3 | 3 | 3 | 2 | 2 | 3 | 2 | 2 | 3 |

As shown in Table 1, the cleaners of Examples 1 to 10 having a PSA that comprised an acrylic block copolymer as the base polymer all exhibited sebum dirt removal rates of 80% or higher. In particular, with respect to the cleaners of Examples 1 to 8 using one or each of acrylic polymers A and B as the base polymer, the sebum removal rates were above 90%, performing comparably to the cleaner of Example 11 having a PSA layer formed from a solvent-based acrylic PSA composition.

The cleaners of Examples 3 to 10 using plasticizer exhibited sebum dirt removal rates of 80% or higher despite that they were easy-release with their adhesive strength at or below 0.80 N/25 mm. In particular, by the cleaners according to Examples 3 to 8 using acrylic polymers A and B in combination with plasticizer, while they are easy-release with their adhesive strength at or below 0.20 N/25 mm, they achieved at least 93% sebum dirt removal rates.

From comparison of Example 1 with Example 3 and comparison of Example 2 with Example 4, it can be seen that the inclusion of plasticizer allows reduction of adhesive strength while increasing the sebum dirt removal rate. From comparison of Examples 3 to 5 with Examples 6 to 8, it can be seen that "MONOCIZER W-242" (diisononyl adipate) is superior in fingerprint removability to "RHEODOL SP-O30V" (sorbitan trioleate). From comparison of Examples 3 to 5, it can be seen that a PSA comprising the acrylic polymer A having a higher Mw is superior in fingerprint removability.

As shown in Table 2, the cleaners of Examples 13 to 19 having a PSA that comprised an acrylic block copolymer as the base polymer all exhibited excellent organic dirt removability with sebum dirt removal rates of at least 90% despite that they were easy-release with their adhesive strength below 0.10 N/25 mm. The cleaners of Examples 13 to 19 performed comparably to the cleaner of Example 11 (solvent-based) in terms of the sebum dirt removal rate, yet they provided excellent dirt-removing workability because of their significantly lower adhesive strength as compared to Example 11. with respect to the cleaner of Example 12 (solvent-based) where the amounts of plasticizer and crosslinking agent in the PSA composition of Example 11 were increased, they were comparable to the cleaners of Examples 13 to 19 in terms of the adhesive strength, they fell short of the performance of Examples 13 to 19 in terms of the sebum dirt removal rate. The symbol "-" for the adhesive strength of Examples 18 and 19 indicates that it was not measured. Although not shown in the tables, by comparison of Examples 13 to 17, with increasing tackifier content, the melt viscosity of PSA decreased and the ease of application increased.

As shown in Table 3, the cleaners of Examples 20 to 29 having a PSA that comprised an acrylic block copolymer as the base polymer all evidently exhibited excellent organic dirt removability with sebum dirt removal rates of at least 94% despite that they were easy-release with their adhesive strength below 0.20 N/25 mm.

Although specific embodiments of the present invention have been described in detail above, these are merely for illustrations and do not limit the scope of patent claims. The art according to the patent claims includes various modifications and changes made to the specific embodiments illustrated above.

REFERENCE SIGNS LIST

1 portable device (article)
2 surface (display)
10 sticky cleaner
20 holding member
30 PSA sheet roll
31 PSA sheet (dirt-collecting member)
32 PSA layer
36 support substrate
40 grip member
42 handle
50 organic dirt

The invention claimed is:

1. A sticky cleaner used for removing organic dirt stuck on a surface of an article,
   the sticky cleaner comprising a dirt-collecting member that collects the organic dirt as it makes contact with the surface of the article,
   the dirt-collecting member comprising a pressure-sensitive adhesive at a part where it makes contact with the surface of the article, and
   the pressure-sensitive adhesive comprising, as its base polymer, an acrylic block copolymer having a hard segment (A) and a soft segment (B) in one molecule,
   wherein the part that makes contact with the surface exhibits an adhesive strength of 1 N/25 mm or less, and
   the soft segment (B) is an acrylate block comprising an alkyl acrylate having 6 to 12 carbon atoms in its alkyl group, as the primary monomer.

2. The sticky cleaner according to claim 1, wherein the pressure-sensitive adhesive further comprises a plasticizer.

3. The sticky cleaner according to claim 1, wherein the pressure-sensitive adhesive further comprises a tackifier resin.

4. The sticky cleaner according to claim 1, wherein the sticky cleaner comprises a cylindrical rolling member, and the dirt-collecting member is arranged along the lateral surface of the rolling member.

5. The sticky cleaner according to claim 1, wherein the dirt-collecting member is constituted as an adhesively single-faced pressure-sensitive adhesive sheet comprising a sheet of support substrate and a pressure-sensitive adhesive layer placed on or above the support substrate, and
   the single-faced pressure-sensitive adhesive sheet is wound with the pressure-sensitive adhesive layer on the outside to form a pressure-sensitive adhesive sheet roll.

6. The sticky cleaner according to claim 1, used for removing sebum dirt as the organic dirt.

7. The sticky cleaner according to claim 1, wherein the article is a portable device having a display with a surface formed of glass or synthetic resin.

8. The sticky cleaner according to claim 1, wherein the pressure-sensitive adhesive is a hot met pressure-sensitive adhesive.

9. The sticky cleaner according to claim 8, wherein the acrylic block copolymer has a weight average molecular weight in a range of $3 \times 10^4$ to $30 \times 10^4$.

10. The sticky cleaner according to claim 9, wherein the acrylic block copolymer is a triblock copolymer.

11. The sticky cleaner according to claim 10, wherein the pressure-sensitive adhesive comprises a plasticizer in an amount of 20 to 70 parts by mass relative to 100 parts by mass of the acrylic block copolymer.

12. The sticky cleaner according to claim 11, wherein the plasticizer comprises at least one selected from the group consisting of adipic acid esters, epoxidized vegetable oils and epoxidized fatty acid alkyl esters.

13. The sticky cleaner according to claim 1, wherein the pressure-sensitive adhesive comprises a plasticizer in an amount of 20 to 70 parts by mass relative to 100 parts by mass of the acrylic block copolymer.

14. The sticky cleaner according to claim 13, wherein the plasticizer comprises at least one selected from the group consisting of adipic acid esters, epoxidized vegetable oils and epoxidized fatty acid alkyl esters.

15. The sticky cleaner according to claim 1, wherein the acrylic block copolymer is a triblock copolymer.

16. A sticky cleaner used for removing organic dirt stuck on a surface of an article, the sticky cleaner comprising a dirt-collecting member that collects the organic dirt as it makes contact with the surface of the article,
   the dirt-collecting member comprising a pressure-sensitive adhesive at a part where it makes contact with the surface of the article,
   the pressure-sensitive adhesive comprising, as its base polymer, an acrylic block copolymer having a hard segment (A) and a soft segment (B) in one molecule,
   wherein the part that makes contact with the surface exhibits an adhesive strength of 1 N/25 mm or less, and
   the starting monomers corresponding to all the monomer units constituting the acrylic block copolymer comprise an alkyl (meth)acrylate monomer (X) having 1 to 3 carbon atoms in its alkyl group and an alkyl (meth) acrylate monomer (Y) having 6 or more carbon atoms in its alkyl group.

* * * * *